(12) United States Patent
Zhuo et al.

(10) Patent No.: US 10,845,967 B2
(45) Date of Patent: Nov. 24, 2020

(54) DISPLAY DEVICE FOR INJECTION MOLDING MACHINE

(71) Applicant: FANUC CORPORATION, Yamanashi (JP)

(72) Inventors: Xinmin Zhuo, Yamanashi (JP); Junpei Maruyama, Yamanashi (JP)

(73) Assignee: FANUC CORPORATION, Yamanashi ( * ) Notice: Subject to any disclaimer, the term of this patent is extended or adjusted under 35 U.S.C. 154(b) by 0 days.

(21) Appl. No.: 16/715,357

(22) Filed: Dec. 16, 2019

(65) Prior Publication Data

US 2020/0210037 A1 Jul. 2, 2020

(30) Foreign Application Priority Data

Dec. 27, 2018 (JP) ................................. 2018-245328

(51) Int. Cl.
*G06F 3/0484* (2013.01)
*B29C 45/17* (2006.01)
*G06F 3/0482* (2013.01)

(52) U.S. Cl.
CPC ........ *G06F 3/0484* (2013.01); *B29C 45/1774* (2013.01); *G06F 3/0482* (2013.01)

(58) Field of Classification Search
CPC ...................... B29C 45/766; B29C 2045/7606
See application file for complete search history.

(56) References Cited

U.S. PATENT DOCUMENTS

| 5,016,184 | A | * | 5/1991 | Gutjahr | B29C 45/76 700/200 |
| 5,195,029 | A | * | 3/1993 | Murai | G05B 23/0275 700/79 |
| 5,539,650 | A | * | 7/1996 | Hehl | B29C 45/766 264/40.1 |
| 8,024,660 | B1 | * | 9/2011 | Quinn | G06F 9/453 715/745 |

(Continued)

FOREIGN PATENT DOCUMENTS

WO       2014192049 A1   12/2014

*Primary Examiner* — Justin S Lee
(74) *Attorney, Agent, or Firm* — Studebaker & Brackett PC

(57) ABSTRACT

The present invention is to provide a display device for an injection molding machine capable of displaying a screen image to be a display candidate without imposing a burden on an operator.
A display device for an injection molding machine includes a display part capable of displaying a predetermined screen image and capable of displaying a candidate for a next screen image to transition to as a display candidate. The display device for the injection molding machine includes an operation information acquisition part configured to acquire, as operation information, operations performed related to a predetermined screen image being displayed, a totalizing part configured to totalize the operations related to the predetermined screen image being displayed on the basis of the acquired operation information, a display candidate determination part configured to determine the candidate for the screen image to be the display candidate on the basis of (Continued)

a totalized result, and a display control part configured to display not only the predetermined screen image but also the determined display candidate on the display part.

8 Claims, 8 Drawing Sheets

(56) References Cited

U.S. PATENT DOCUMENTS

| | | | | |
|---|---|---|---|---|
| 8,661,369 B2* | 2/2014 | Heo | ............. | G06F 3/04842 |
| | | | | 715/864 |
| 9,069,580 B2* | 6/2015 | Armstrong | ......... | G06F 3/04842 |
| 9,250,760 B2* | 2/2016 | Balasubramanyan | .. | G06F 3/048 |
| 10,232,536 B2* | 3/2019 | Uchiyama | ............ | B29C 45/768 |
| 10,320,926 B2* | 6/2019 | O'Doherty | ............. | H04L 67/22 |
| 10,579,400 B2* | 3/2020 | Duesterwald | ........... | G06F 11/34 |
| 10,618,202 B2* | 4/2020 | Maruyama | ............ | B29C 45/768 |
| 10,621,677 B2* | 4/2020 | Mascaro | ........... | G06Q 30/0201 |
| 2002/0015056 A1* | 2/2002 | Weinlaender | ........... | G06F 9/453 |
| | | | | 715/705 |
| 2005/0206025 A1* | 9/2005 | Kamiguchi | ............. | B29C 45/77 |
| | | | | 264/40.5 |
| 2006/0082009 A1* | 4/2006 | Quail | .................... | B22D 17/007 |
| | | | | 264/40.1 |
| 2013/0100032 A1* | 4/2013 | Miyazaki | ................ | B29C 45/76 |
| | | | | 345/169 |
| 2013/0103184 A1* | 4/2013 | Morikawa | ............. | B22D 17/32 |
| | | | | 700/197 |
| 2016/0110032 A1* | 4/2016 | Okochi | ................ | B29C 45/766 |
| | | | | 425/162 |
| 2017/0003983 A1* | 1/2017 | Park | ....................... | G06F 3/013 |
| 2019/0381240 A1* | 12/2019 | Novickoff | ........... | A61M 5/1458 |

* cited by examiner

FIG. 3

DISPLAY
CANDIDATE 1

DISPLAY
CANDIDATE 2

DISPLAY
CANDIDATE 3

⋮

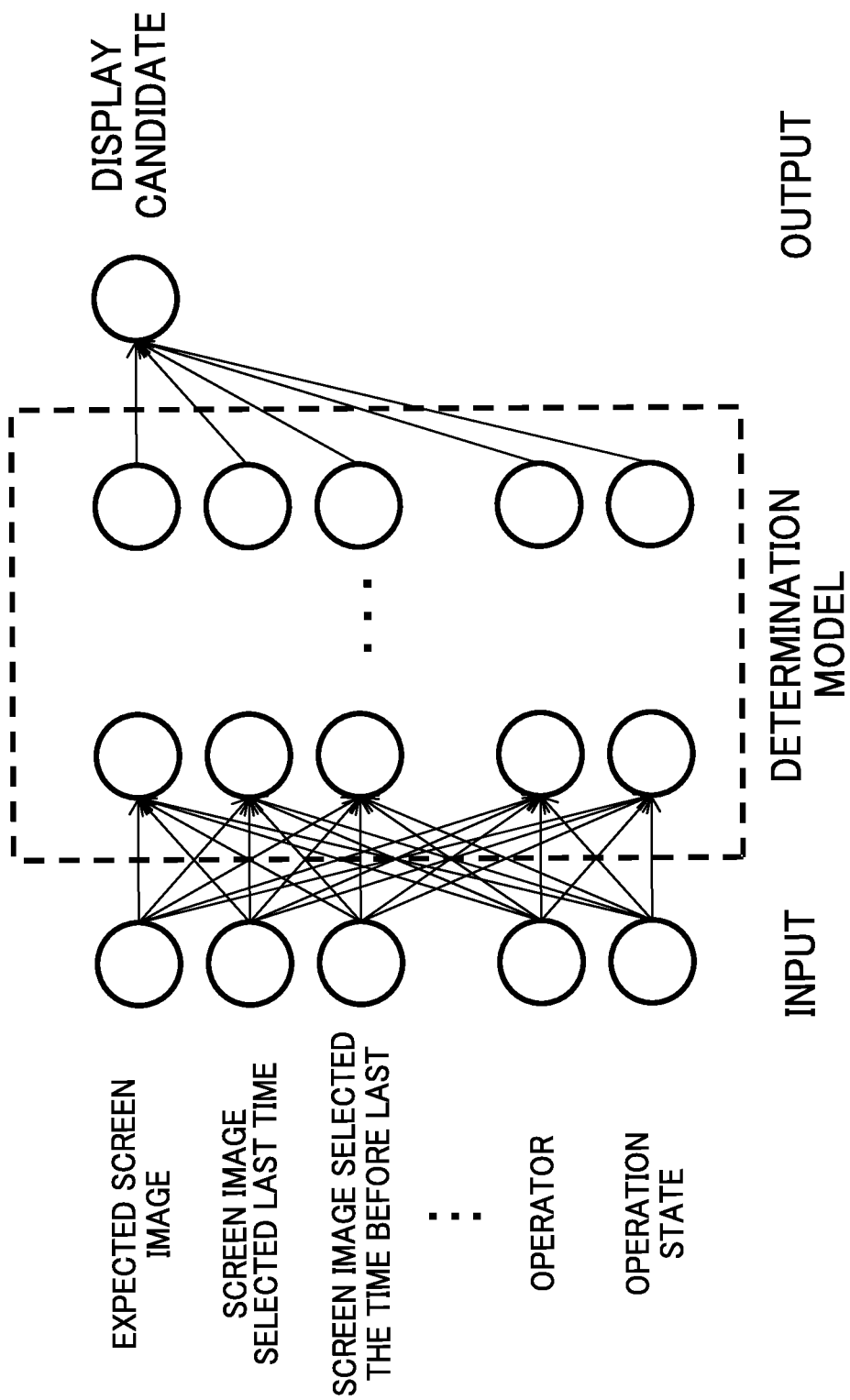

DISPLAY DEVICE FOR INJECTION MOLDING MACHINE

This application is based on and claims the benefit of priority from Japanese Patent Application No. 2018-245328, filed on 27 Dec. 2018, the content of which is incorporated herein by reference.

BACKGROUND OF THE INVENTION

Field of the Invention

The present invention relates to a display device for an injection molding machine.

Related Art

Conventionally, an injection molding machine is a machine tool configured to inject and mold, for example, resin. Before the injection molding machine operates, a value related to the operation of the injection molding machine is set in advance to the injection molding machine. The injection molding machine operates on the basis of the set value.

There are many types of screen images to be displayed on the display device for the injection molding machine. For example, there are fifty types of screen images to be displayed on the display device for the injection molding machine. It takes a long time to find and select the next screen image to transition to out of these screen images. Therefore, a control device for an injection molding machine is proposed, allowing an operator to select a display screen image to be displayed on a display device for the injection molding machine with less burden on the operator (refer to, for example, Patent Document 1).

Patent Document 1: PCT International Publication No. WO2014/192049

SUMMARY OF THE INVENTION

The control device disclosed in Patent Document 1 includes a plurality of display image selection buttons for selecting a display image. The plurality of display image selection buttons for displaying display images are configured so as to be displayed on a display part. An operator is able to make a desired display image selection button displayed on the display part by customizing the display image selection button.

However, in the control device disclosed in Patent Document 1, an operator has to take time to select a display image in order to customize the display image selection button. The operator further has to take time to re-perform the customization when the display image selection button is to be updated. Therefore, it is preferable that a screen image to be a display candidate can be displayed without imposing a burden on an operator.

The present invention is to provide a display device for an injection molding machine capable of displaying a screen image to be a display candidate without imposing a burden on an operator.

(1) The present invention relates to a display device (for example, a display device 1 to be described below) for an injection molding machine (for example, an injection molding machine 200 to be described below) including a display part (for example, a display part 100 to be described below) capable of displaying a predetermined screen image and capable of displaying a candidate for a next screen image to transition to as a display candidate. The display device for the injection molding machine includes an operation information acquisition part (for example, an operation information acquisition part 13 to be described below) configured to acquire, as operation information, operations performed related to a predetermined screen image being displayed, a totalizing part (for example, a totalizing part 16 to be described below) configured to totalize the operations related to the predetermined screen image being displayed on the basis of the acquired operation information, a display candidate determination part (for example, a display candidate determination part 17 to be described below) configured to determine the candidate for the screen image to be the display candidate on the basis of a totalized result, and a display control part (for example, a display control part 18 to be described below) configured to display not only the predetermined screen image but also the determined display candidate on the display part.

(2) In the display device for the injection molding machine according to (1) above, the totalizing part preferably totalizes the operations related to the predetermined screen image being displayed on the basis of at least one of a number of times of the input operations related to the predetermined screen image, a number of times of the input operations related to the predetermined screen image per a fixed time, a display time of the predetermined screen image, and a number of times of display of the predetermined screen image within a predetermined time, as the operation information.

(3) In the display device for the injection molding machine according to (2) above, the totalizing part preferably performs weighting with respect to the respective numbers of times and the display time included in the operation information, and preferably further totalizes the operations related to the predetermined screen image being displayed on the basis of the result of the weighting.

(4) In the display device for the injection molding machine according to (1) above, the totalizing part preferably totalizes the operations related to the predetermined screen image being displayed on the basis of the predetermined screen image and a number of times of a combination of the next screen image transitioned to and the original predetermined screen image as the operation information.

(5) The display device for the injection molding machine according to any one of (1) to (4) above preferably further includes an operation state acquisition part (for example, an operation state acquisition part 19 to be described below) configured to acquire an operation state of the injection molding machine. The display candidate determination part preferably determines the candidate for the screen image to be the display candidate on the basis of the acquired operation state.

(6) The display device for the injection molding machine according to any one of (1) to (5) above preferably further includes an identification part (for example, an identification part 20 to be described below) configured to identify an operator operating the injection molding machine. The display candidate determination part preferably determines display candidates for each operator identified by the identification part.

(7) In the display device for the injection molding machine according to any one of (1) to (6) above, the display control part preferably displays the determined display candidates in a list form or in a strip form on the display part.

(8) In the display device for the injection molding machine according to any one of (1) to (7) above, the display candidate determination part preferably determines a next transition destination on the basis of the result totalized by the totalizing part and a history of the results having been totalized by the totalizing part, and preferably further determines the candidate for the screen image to be the determined transition destination as the display candidate.

The present invention enables to provide a display device for an injection molding machine capable of displaying a screen image to be a display candidate without imposing a burden on an operator.

BRIEF DESCRIPTION OF THE DRAWINGS

FIG. 3 is a schematic diagram illustrating a screen image to be displayed on a display part by a display control part of the display device for the injection molding machine according to the second embodiment.

FIG. 8 is a conceptual diagram illustrating a determination model of the display device for the injection molding machine according to the fifth embodiment.

DETAILED DESCRIPTION OF THE INVENTION

A display device 1 for an injection molding machine 200 according to respective embodiments of the present invention will be described below by referring to FIG. 1 to FIG. 8. The outlines of the injection molding machine 200 and the display device 1 for the injection molding machine 200 are described first.

The injection molding machine 200 is configured to manufacture products (molded items) by injecting, for example, high temperature molten resin into a mold and then cooling the resin. In the case where products are manufactured by the injection molding machine 200, the injection molding machine 200 is made to operate on the basis of a preset value (set value), thereby enabling to manufacture products in more preferable states. The set value is adjusted and determined on the basis of, for example, the value and the determination of the setting input in the injection molding machine 20 by an operator M who controls the injection molding machine 200.

In an example, the value and the determination are input into the injection molding machine 200 by use of the display device 1 connected to the injection molding machine 200. Specifically, the display device 1 for the injection molding machine 200 displays a plurality of screen images by making them transition and accepts the input of the value and the input of the determination from the operator M. The display device 1 for the injection molding machine 200 displays display candidates to be the next transition destination screen image, in the screen image being displayed. The display device 1 for the injection molding machine 200 urges the operator M to select the next screen image out of the display candidates, thereby switching the screen image from the currently displayed screen image to the selected screen image. In each of the following embodiments, the display device 1 for the injection molding machine 200 is configured to display, for example, at least one screen image highly relevant to the screen image being displayed out of 50 types or more of screen images in general, as a display candidate.

First Embodiment

Figure 1:
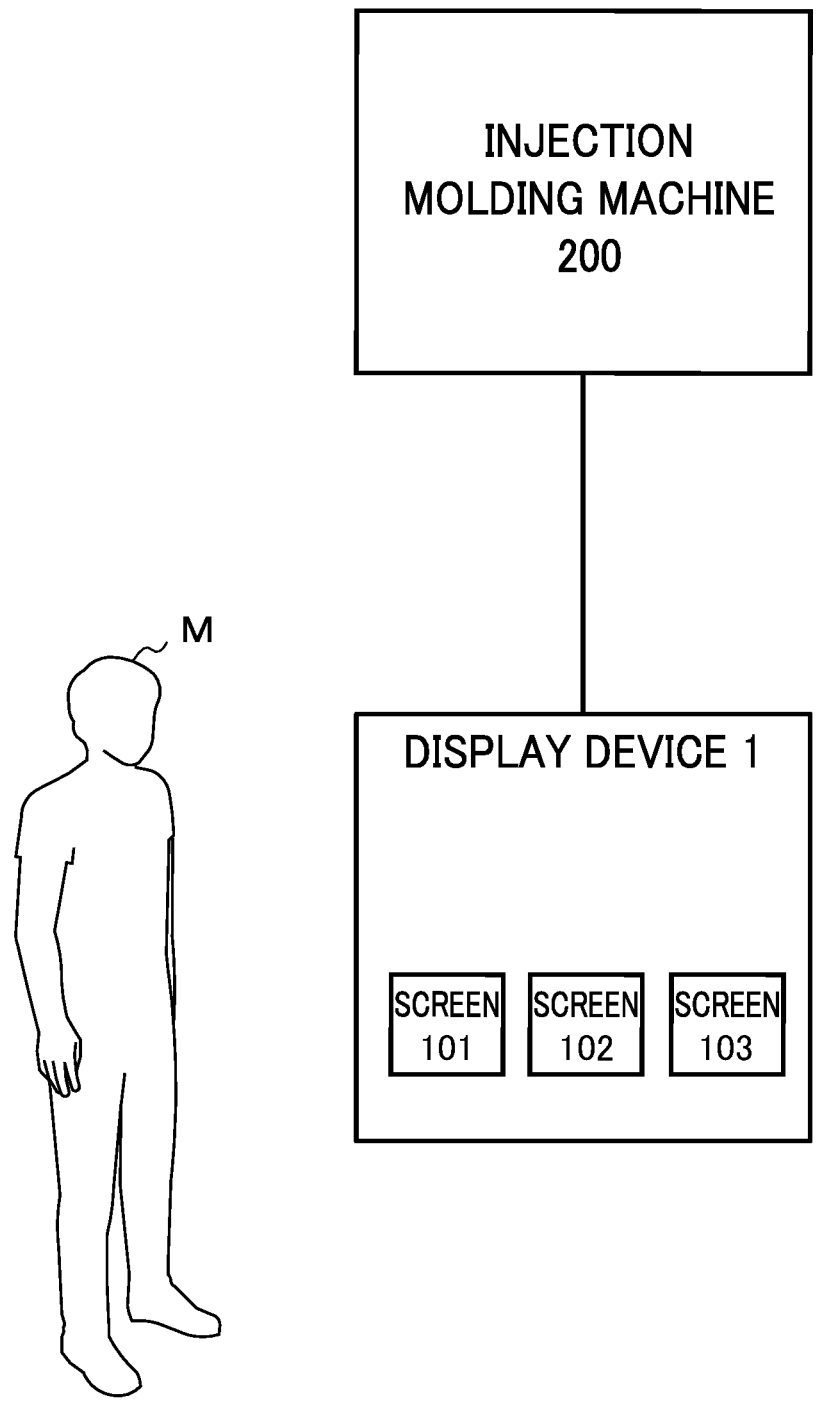
FIG. 1 is a schematic configuration diagram illustrating a display device for an injection molding machine according to a first embodiment of the present invention.
Figure 2:
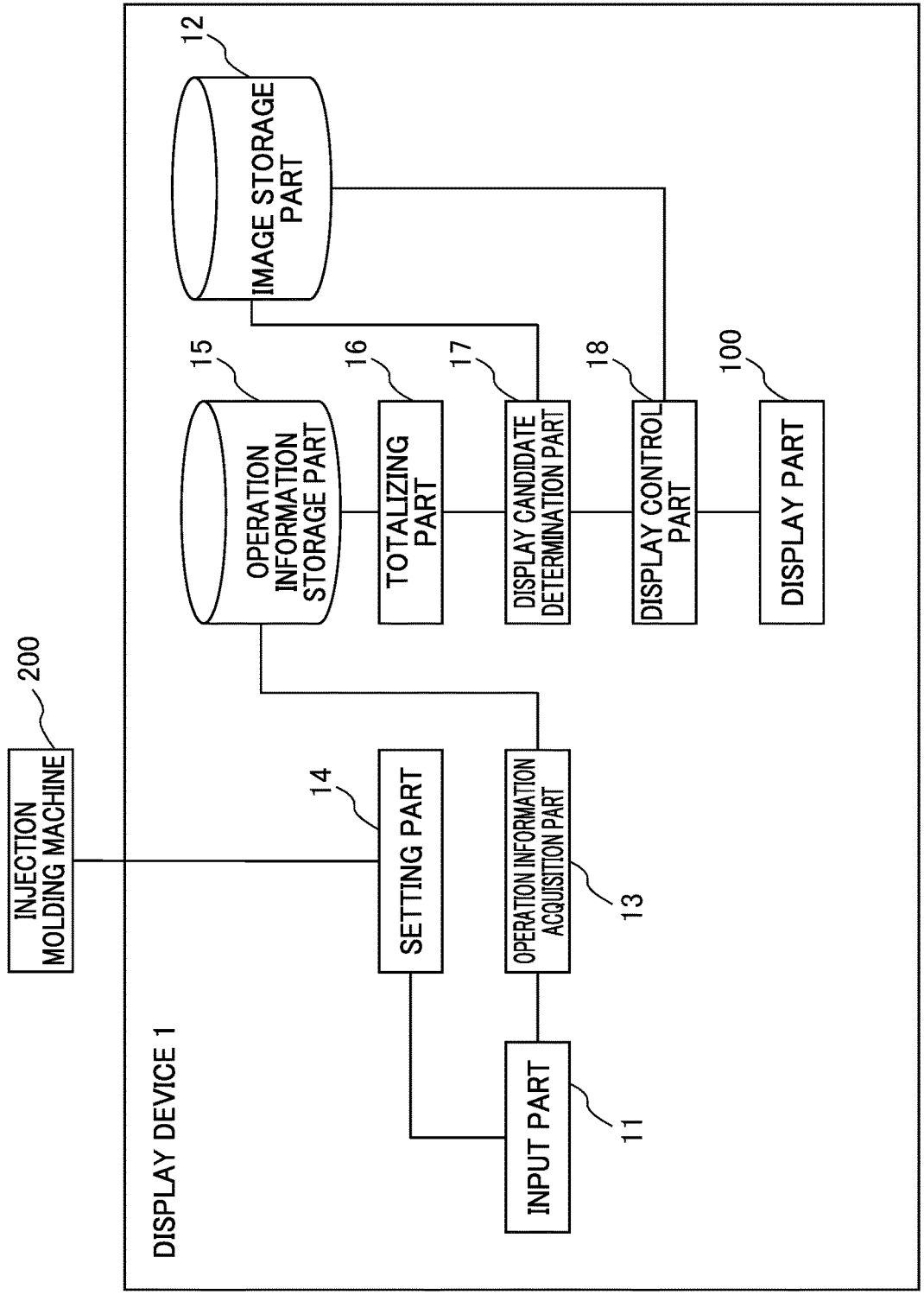
FIG. 2 is a block diagram illustrating a display device for an injection molding machine according to a second embodiment.

The display device 1 for the injection molding machine 200 according to the first embodiment of the present invention is described below by referring to FIG. 1 to FIG. 4. As shown in FIG. 1, the display device 1 for the injection molding machine 200 according to the present embodiment is arranged to be connected to the injection molding machine 200. The display device 1 for the injection molding machine 200 includes a display part 100 capable of displaying a predetermined screen image and capable of displaying a candidate for a next screen image to transition to as a display candidate. As shown in FIG. 2, the display device 1 for the injection molding machine 200 includes an input part 11, an image storage part 12, an operation information acquisition part 13, a setting part 14, an operation information storage part 15, a totalizing part 16, a display candidate determination part 17, and a display control part 18.

The display part 100 is an image output device, for example, a monitor. The display part 100 is configured to be capable of displaying various types of screen images related to the injection molding machine 200. The display part 100 displays, for example, the screen image for inputting a set value into the injection molding machine 200. The display part 100 further displays, for example, the screen image indicating the operating state of the injection molding machine 200. In the present embodiment, the display part 100 includes three screens. In an example, the display part 100 includes two screens 101, 102 indicating the operating state and the like and a screen 103 indicating the display candidate.

In an example, the input part 11 is an input device such as a keyboard or a mouse, or a touch sensor configured integrally with the display part 100. The input part 11 accepts the input of a set value and the input of determination of setting from the operator M who operates the injection molding machine 200.

The image storage part 12 is a secondary storage medium, for example, a hard disk. The image storage part 12 stores information on a plurality of screen images to be displayed on the display part 100. In an example, the image storage part 12 stores information on the plurality of screen images for controlling the operation of the injection molding machine 200 or confirming the state thereof.

The operation information acquisition part 13 is realized by, for example, the operation of a CPU (central processing unit). The operation information acquisition part 13 acquires the operation performed in relation with a predetermined screen image being displayed as operation information. In an example, the operation information acquisition part 13 acquires the number of times of the input operations related to the screen image being displayed as operation information. In an example, the operation information acquisition part 13 acquires the number of times of the input operations per a fixed time (the average number of times of the operations per unit time) related to a predetermined screen image. In an example, the operation information acquisition part 13 acquires a display time of a predetermined screen image as operation information. In an example, the operation information acquisition part 13 acquires the number of times of display of a predetermined screen image within a predetermined time as operation information.

The setting part 14 is realized by, for example, the operation of the CPU. The setting part 14 is connected to the input part 11. The setting part 14 is connected further to the injection molding machine 200. The setting part 14 sets the set value and the determination input through the input part 11 to the injection molding machine 200.

The operation information storage part 15 is a secondary storage medium, for example, a hard disk. The operation information storage part 15 stores the operation information acquired by the operation information acquisition part 13.

The totalizing part 16 is realized by, for example, the operation of the CPU. The totalizing part 16 totalizes the operations related to the predetermined screen image being displayed on the basis of the acquired operation information. In an example, the totalizing part 16 totalizes the operations related to the predetermined screen image being displayed on the basis of at least one of the number of times of the input operations related to the screen image being displayed, the number of times of the input operations related to the predetermined screen image per a fixed time, the display time of the predetermined screen image, and the number of times of the display of the predetermined screen image within a predetermined time. The totalizing part 16 totalizes, by points-based scoring, the operations executed while the predetermined screen image included in the acquired operation information is being displayed. The totalizing part 16 totalizes, by points-based scoring for each predetermined screen image, at least one of the number of times of the input operations related to the screen image being displayed, the number of times of the input operations related to the predetermined screen image per a fixed time, the display time of the predetermined screen image, and the number of times of the display of the predetermined screen image within a predetermined time. Specifically, the totalizing part 16 multiplies, by a predetermined coefficient, at least one of the respective numbers of times and the display time included in the operation information, thereby totalizing the weighted operations related to the screen image being displayed.

The display candidate determination part 17 is realized by, for example, the operation of the CPU. The display candidate determination part 17 determines a candidate for the screen image to be a display candidate on the basis of the totalized result. In an example, the display candidate determination part 17 determines at least one screen image as a candidate for the screen image to be a display candidate in descending order of the points-based scores totalized by the totalizing part 16. In the present embodiment, the display candidate determination part 17 determines five to ten screen images as the candidates for the screen images to be display candidates. In an example, the display candidate determination part 17 reads the screen image thumbnails stored in the image storage part 12 as candidates for the screen images to be display candidates. The display candidate determination part 17 sends the read thumbnails to the display control part 18.

The display control part 18 is realized by, for example, the operation of the CPU. The display control part 18 displays not only the predetermined screen images but also the determined display candidates on the display part 100. The display control part 18 further displays the screen image selected by the operator M as a transition destination. The display control part 18 displays the determined display candidates in a list form or in a strip form on the display part 100. In an example, as shown in FIG. 3, the display control part 18 displays the display candidates in a list.

Figure 4:
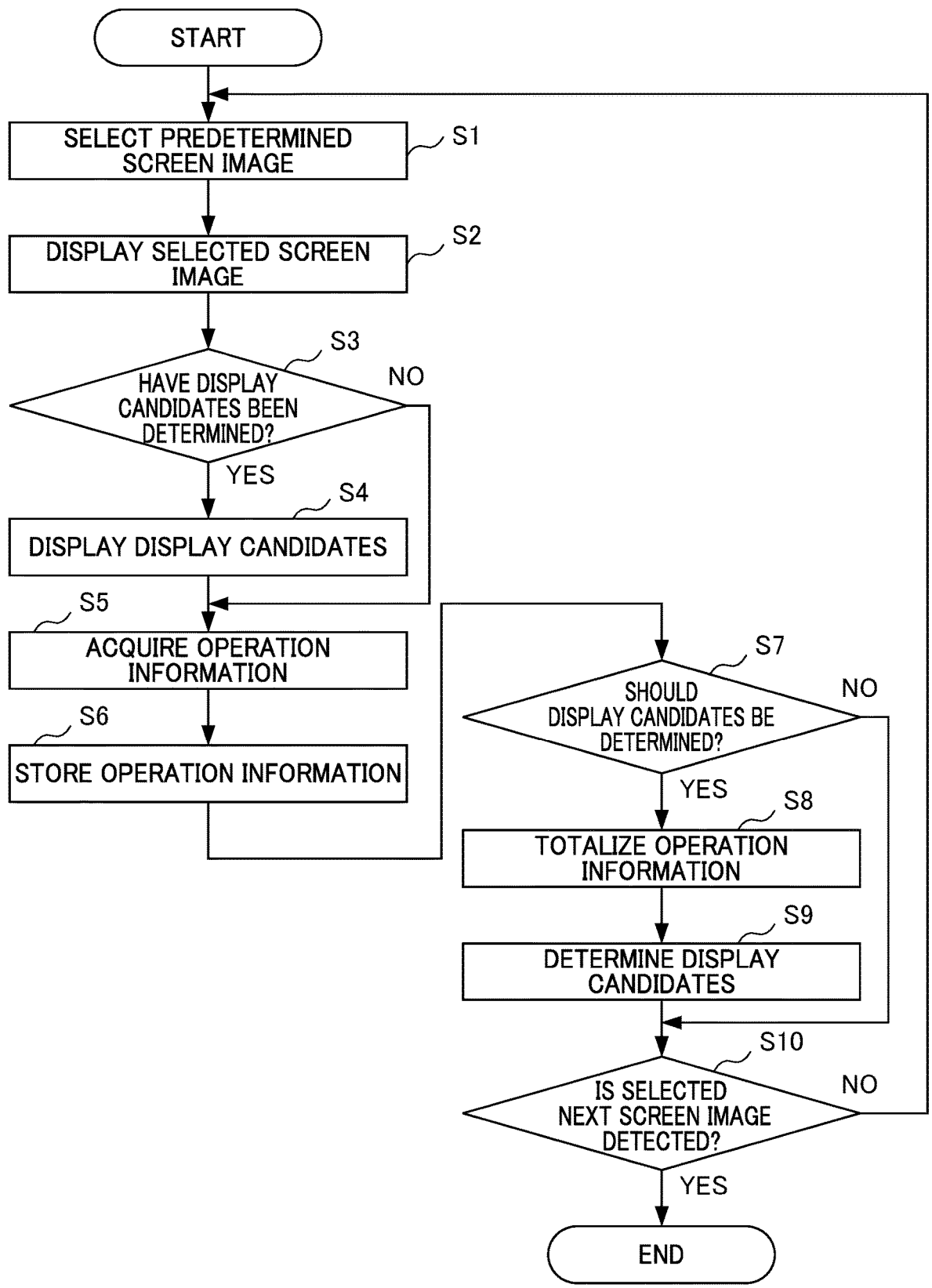
FIG. 4 is a flowchart indicating a processing flow of the display device for the injection molding machine according to the second embodiment.

The operation of the display device 1 for the injection molding machine 200 according to the present embodiment is described below by referring to the flowchart shown in FIG. 4. First, the screen image to be displayed is selected by the operator M (step S1). The input part 11 accepts the screen image selection from the operator M. The input part 11 sends the accepted screen image selection to the display control part 18.

The display control part 18 then displays the selected screen image on the display part 100 (step S2). In an example, the display control part 18 reads, from the image storage part 12, information on the screen image selected in the accepted screen image selection and displays the screen image on the display part 100.

It is then determined whether or not the display candidates to be displayed together with the screen image to be displayed on the display part 100 have been determined (step S3). In the case where the display candidate determination part 17 has already determined the candidates for the screen images to be display candidates, the processing proceeds to step S4 (step S3: YES). In the case where the display candidate determination part 17 has not yet determined the candidates for the screen images to be display candidates, the processing proceeds to step S5 (step S3: NO).

In step S4, the display control part 18 displays not only the selected predetermined screen image but also the display candidates. In an example, the display control part 18 displays the selected predetermined screen images on the screens 101, 102. The display control part 18 further displays the plurality of screen images to be display candidates already having been determined by the display candidate determination part 17 on the screen 103. The processing then proceeds to step S5.

In step S5, the operation information acquisition part 13 acquires the operation information. The operation information acquisition part 13 acquires the operation related to the screen image displayed on the display part 100 as operation information. The operation information acquisition part 13 then stores the acquired operation information in the operation information storage part 15 (step S6).

Then, the operation information is totalized, and whether to determine the display candidates is determined (step S7). In the case where the display candidates are to be determined, the processing proceeds to step S8 (step S7: YES). In the case where the display candidates are not to be determined, the processing proceeds to step S10 (step S7: NO).

In step S8, the totalizing part 16 totalizes operation information for each predetermined screen image. The totalizing part 16 totalizes operation information by scoring the performed operations for each predetermined screen image based on points. The totalizing part 16 sends the totalization results to the display candidate determination part 17.

The display candidate determination part 17 then determines candidates for the screen images to be display candidates (step S9). The display candidate determination part 17 determines candidates for the screen images to be display candidates on the basis of the totalization results obtained by the totalizing part 16. In an example, the display candidate determination part 17 determines, as display candidates, a predetermined number of the screen images in descending order of the points-based scores from the totalization results. The processing then proceeds to step S10.

In step S10, it is determined whether or not selecting a screen image to display next is detected. In the case where the input part 11 accepts the selection of a screen image to display next, the processing returns to step S1. In the case where the input part 11 accepts the selection to finish the processing, the processing in the present flowchart ends.

The display device 1 for the injection molding machine 200 according to the present embodiment described above exhibits the following effects.

(1) The display device 1 for the injection molding machine 200 includes the display part 100 capable of displaying a predetermined screen image and capable of displaying candidates for the next screen image to transition to as display candidates. The display device 1 for the injection molding machine 200 includes the operation information acquisition part 13 configured to acquire, as operation information, the operations performed related to the predetermined screen image being displayed, the totalizing part 16 configured to totalize the operations related to the predetermined screen image being displayed on the basis of the acquired operation information, the display candidate determination part 17 configured to determine candidates for the screen images to be display candidates on the basis of the totalized results, and the display control part 18 configured to display not only the predetermined screen image but also the determined display candidates on the display part 100. This enables to determine candidates for the screen images to be display candidates simply when an operator makes the display device 1 operate. Accordingly, the display device 1 for the injection molding machine 200 is capable of displaying the screen images to be display candidates without imposing a burden on the operator.

(2) The totalizing part 16 totalizes the operations related to the predetermined screen image being displayed on the basis of at least one of the number of times of the input operations related to the predetermined screen image, the number of times of the input operations related to the predetermined screen image per a fixed time, the display time of the predetermined screen image, and the number of times of the display of the predetermined screen image within a predetermined time, as the operation information. This enables to totalize the use state of the screen images used when the injection molding machine 200 is made to operate, thereby enabling to present screen images to be displayed as display candidates that are more highly relevant to the work contents of the operator.

(3) The totalizing part 16 performs weighting with respect to the respective numbers of times and the display time included in the operation information and totalizes the operations related to the predetermined screen image being displayed on the basis of the result of the weighting. This enables to change the totalization results on the basis of the state of the injection molding machine 200 and the like, thereby enabling to provide an apparatus having more flexibility.

(4) The display control part 18 displays, on the display part 100, the determined display candidates in a list form or in a strip form. This enables to display the display candidates in an easy-to-understand manner for the operator.

Second Embodiment

The display device 1 for the injection molding machine 200 according to the second embodiment of the present invention is described below. In the description of the second embodiment, the same components as those of the above-described embodiment are denoted by the same reference numerals, and descriptions thereof are omitted or simplified. The display device 1 for the injection molding machine 200 according to the second embodiment is different from that according to the first embodiment, in that the totalizing part 16 totalizes the operations related to the predetermined screen image being displayed on the basis of the predetermined screen image and the number of times of a combination of the next screen image transitioned to and the original predetermined screen image as operation information.

In an example, the totalizing part 16 totalizes the number of times of transition to the next screen image transitioned to for each predetermined screen image. The totalizing part 16 sends the number of times of transition as a totalization result to the display control part 18.

The display device 1 for the injection molding machine 200 according to the present embodiment described above exhibits the following effect.

(5) The totalizing part 16 totalizes the operations related to the predetermined screen image being displayed on the basis of the predetermined screen image and the number of times of a combination of the next screen image transitioned to and the original predetermined screen image as operation information. This enables to determine candidates for the screen images to be display candidates on the basis of the flow of a series of operations. Accordingly, the control of the injection molding machine 200 is enabled to be improved in flexibility.

Third Embodiment

Figure 5:
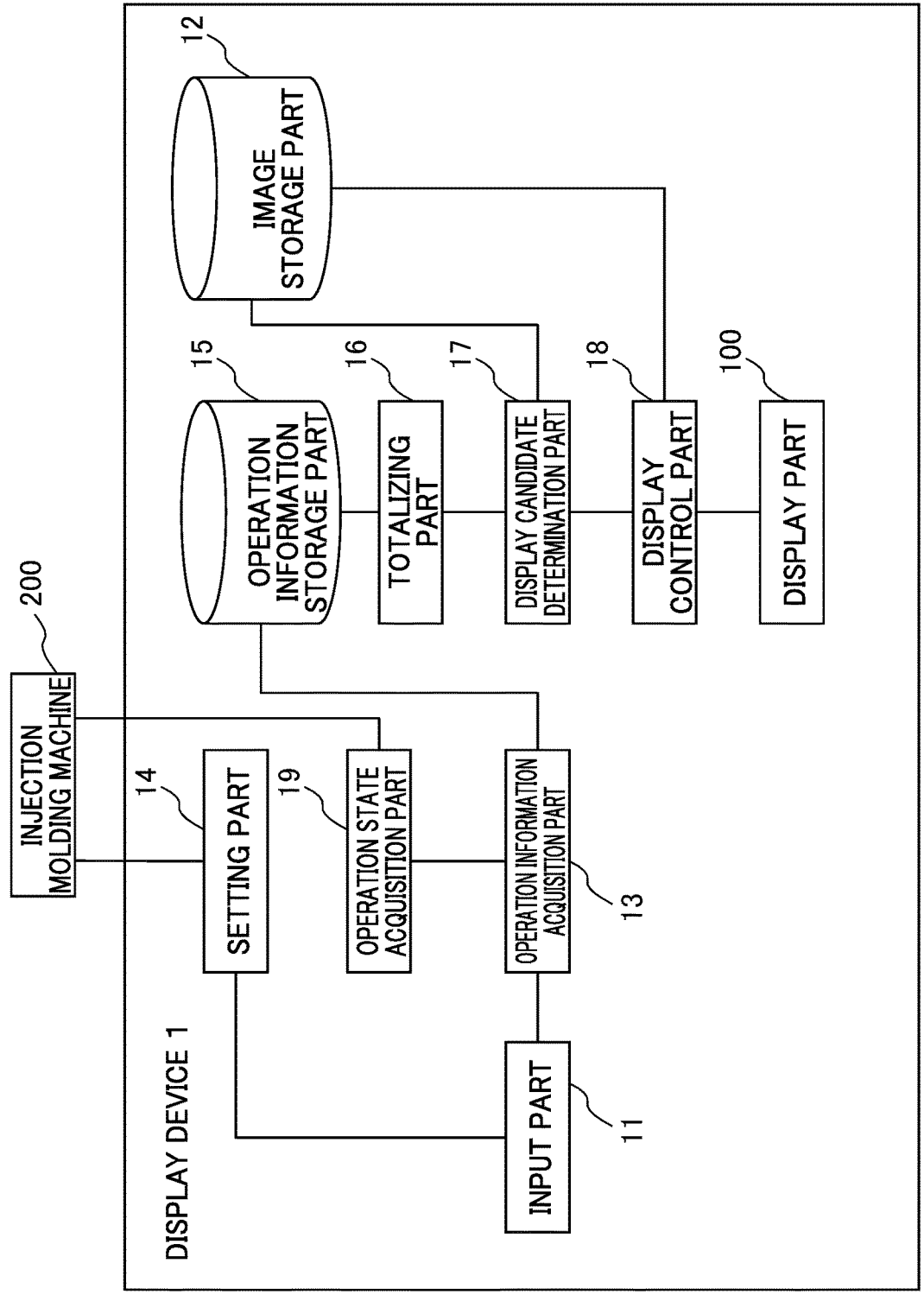
FIG. 5 is a block diagram illustrating a display device for an injection molding machine according to a third embodiment of the present invention.

The display device 1 for the injection molding machine 200 according to the third embodiment of the present invention is described below by referring to FIG. 5. In the description of the third embodiment, the same components as those of the above-described embodiments are denoted by the same reference numerals, and descriptions thereof are omitted or simplified. As shown in FIG. 5, the display device 1 for the injection molding machine 200 according to the third embodiment is different from those according to the first and second embodiments, in that the display device 1 further includes an operation state acquisition part 19. Further, the display device 1 for the injection molding machine 200 according to the third embodiment is different from those according to the first and second embodiments, in that the display candidate determination part 17 determines candidates for the screen images to be display candidates on the basis of the acquired operating state.

The operation state acquisition part 19 is realized by, for example, the operation of a CPU. The operation state acquisition part 19 acquires the operation state of the injection molding machine 200. In an example, the operation state acquisition part 19 acquires a state such as under operation, under setting, or under maintenance, as the operation state. The operation state acquisition part 19 sends the acquired operation state to the display candidate determination part 17.

The display candidate determination part 17 determines candidates for the screen images to be display candidates for each operation state. The display candidate determination part 17 determines candidates for the screen images to be display candidates for each state of the injection molding machine 200 such as under operation, under setting, or under maintenance.

The display device 1 for the injection molding machine 200 according to the present embodiment described above exhibits the following effect.

(6) The display device 1 for the injection molding machine 200 further includes the operation state acquisition part 19 configured to acquire the operation state of the injection molding machine 200. The display candidate determination part 17 determines candidates for the screen images to be display candidates on the basis of the acquired operation state. This enables to determine candidates for the screen images to be display candidates more corresponding to the state.

Fourth Embodiment

Figure 6:
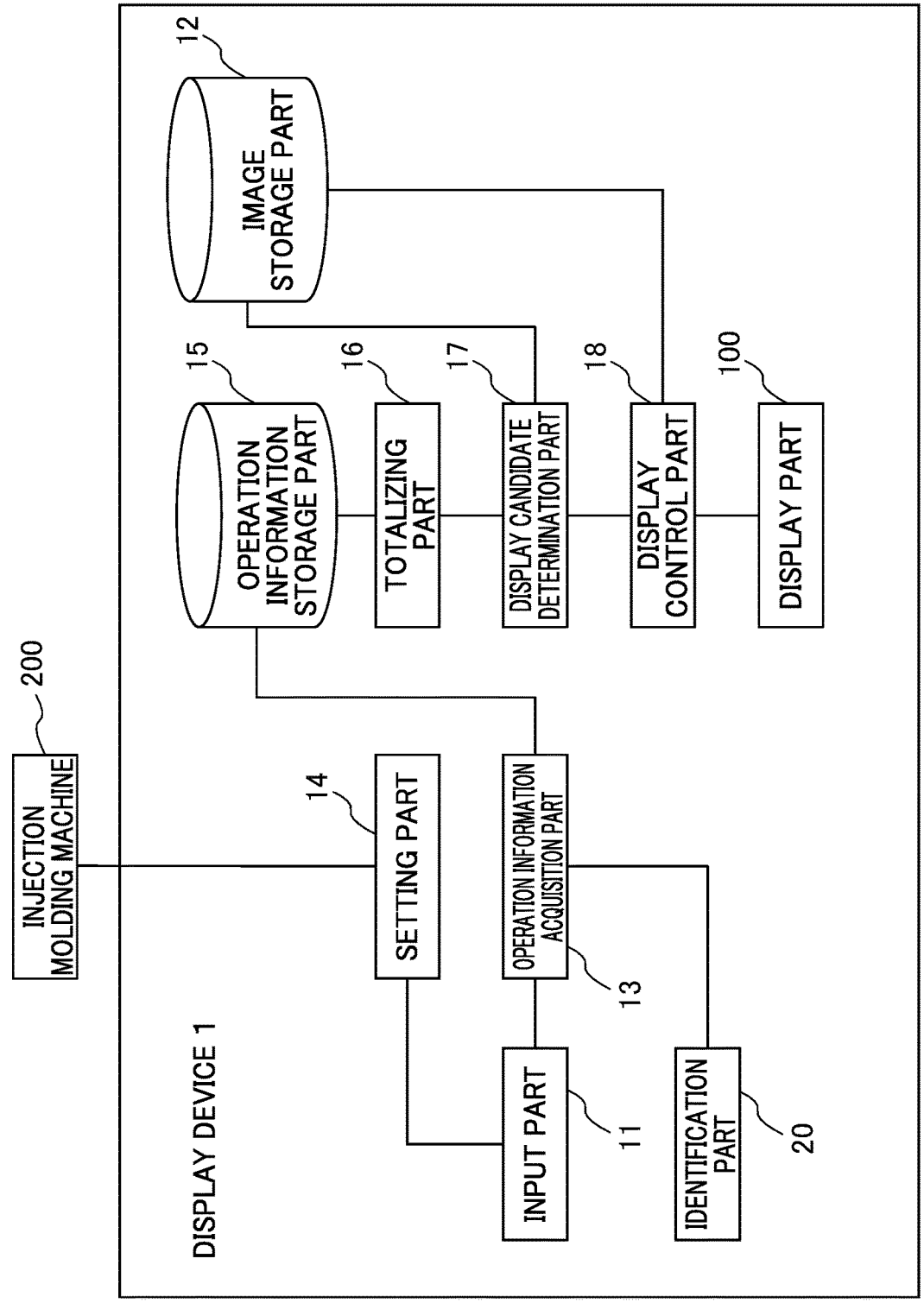
FIG. 6 is a block diagram illustrating a display device for an injection molding machine according to a fourth embodiment of the present invention.

The display device 1 for the injection molding machine 200 according to the fourth embodiment of the present invention is described below by referring to FIG. 6. In the description of the fourth embodiment, the same components as those of the above-described embodiments are denoted by the same reference numerals, and descriptions thereof are omitted or simplified. As shown in FIG. 6, the display device 1 for the injection molding machine 200 according to the fourth embodiment is different from those according to the first to third embodiments, in that the display device 1 further includes an identification part 20. Further, the display device 1 for the injection molding machine 200 according to the fourth embodiment is different from those according to the first to third embodiments, in that the totalizing part 16 totalizes operation information for each identified operator M. Further, the display device 1 for the injection molding machine 200 according to the fourth embodiment is different from those according to the first to third embodiments, in that the display candidate determination part 17 determines display candidates for each identified operator M.

The display device 1 for the injection molding machine 200 according to the present embodiment described above exhibits the following effect.

(7) The display device 1 for the injection molding machine 200 further includes the identification part 20 configured to identify the operator M who operates the injection molding machine 200. The display candidate determination part 17 determines display candidates for each identified operator M. This enables to determine display candidates more highly related to the operation by the operator M. Accordingly, the display device 1 for the injection molding machine 200 having easier operability for the operator M is enabled to be provided.

Fifth Embodiment

Figure 7:
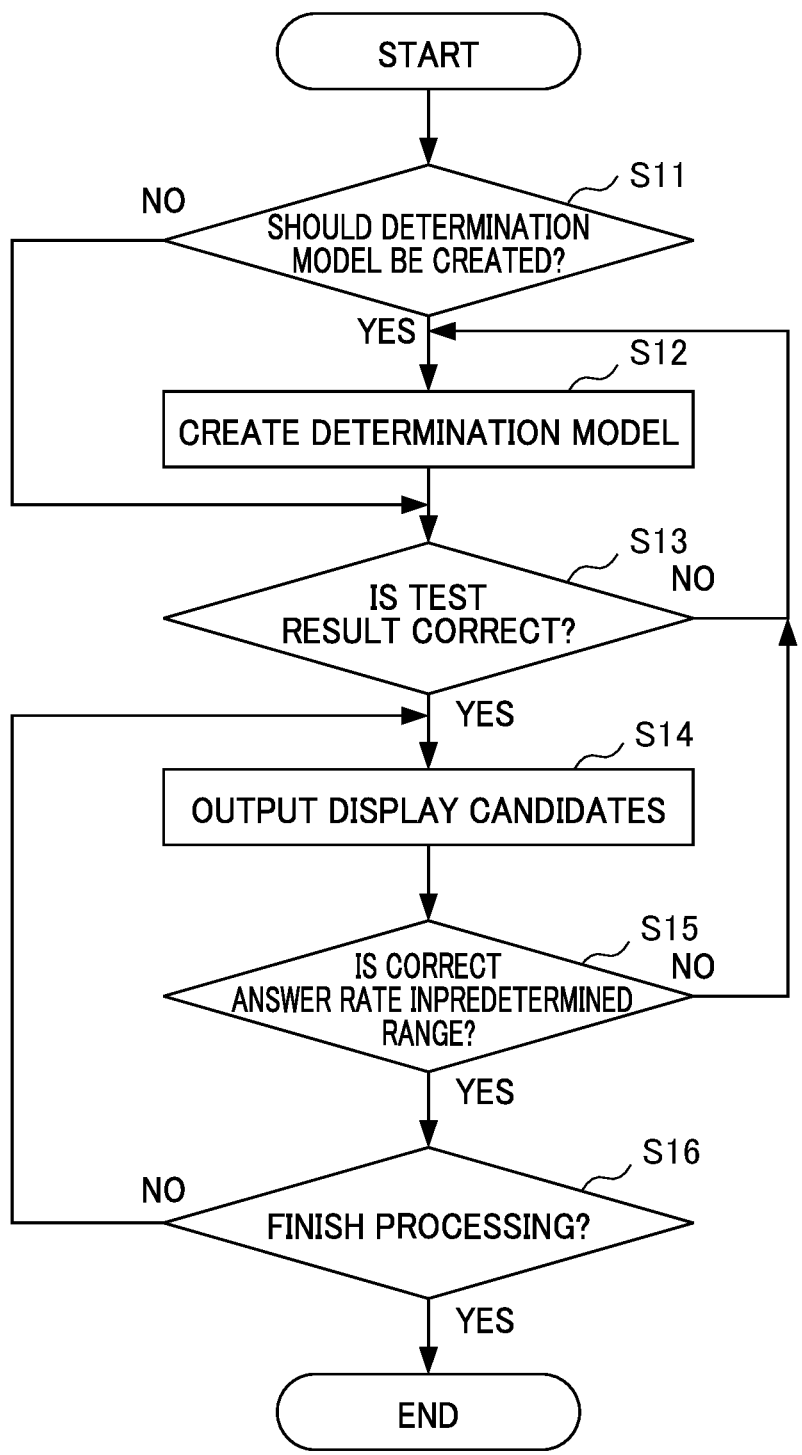
FIG. 7 is a flowchart indicating a processing flow of a display device for an injection molding machine according to a fifth embodiment of the present invention.

The display device 1 for the injection molding machine 200 according to the fifth embodiment of the present invention is described below by referring to FIG. 7 and FIG. 8. In the description of the fifth embodiment, the same components as those of the above-described embodiments are denoted by the same reference numerals, and the descriptions thereof are omitted or simplified. The display device 1 for the injection molding machine 200 according to the fifth embodiment is configured to perform machine learning on the basis of the results of a combination of the respective embodiments according to the second to fourth embodiments, thereby outputting a determined display result. That is, in the display device 1 for the injection molding machine 200 according to the fifth embodiment, the display candidate determination part 17 determines (expects) next transition destinations and determines candidates for the screen images to be the determined transition destination as display candidates on the basis of the results totalized by the totalizing part 16 and the history of the results having been totalized by the totalizing part 16. Further, the display device 1 for the injection molding machine 200 according to the fifth embodiment is different from those according to the first to fourth embodiments in that the totalizing part 16 starts the totalization when the operation information acquisition part 13 acquires a previously-set required number of pieces of operation information. Further, the display device 1 for the injection molding machine 200 according to the fifth embodiment is different from those according to the first to fourth embodiments, in that the display candidate determination part 17 calculates a correct answer rate of the actual transitioned screen images to the display candidates actually displayed. Further, the display device 1 for the injection molding machine 200 according to the fifth embodiment is different from those according to the first to fourth embodiments, in that the totalizing part 16 re-performs the totalization in the case where the correct answer rate is lower than a predetermined value.

The operation of the display device 1 for the injection molding machine 200 according to the present embodiment is described below by referring to the flowchart shown in FIG. 7. It is noted that the present flowchart changes the steps of step S7 to step S9 of the flowchart shown in FIG. 4. First, in step S11, the display candidate determination part 17 determines whether to create a determination model for determining display candidates on the basis of a plurality of pieces of operation information, the operation state, and the identified operator M. The determination model herein is a model for determining candidates for the screen images to be the next display candidates determined on the basis of the plurality of pieces of operation information, the operation state, and the identified operator M. In the case where the determination model is to be created, the processing proceeds to step S12. In the case where the determination model has already been created and a determination model is not to be re-created, the processing proceeds to step S13.

In step S12, the display candidate determination part 17 acquires a predetermined number of pieces of operation information and creates the determination model. In an example, as shown in FIG. 8, the display candidate determination part 17 creates the determination model for determining the screen image expected to be the next to transition to according to the transition order of the screen image as display candidates on the basis of the specific operation state and the identified operator M.

The display candidate determination part 17 is then subjected to evaluation of the test result performed on the basis of the created determination model (step S13). In the case where, as a result of the evaluation (test), the display candidate determination part 17 has determined correct screen images as display candidates, the processing proceeds to step S14. In the case where the display candidate determination part 17 has failed to determine correct screen images as display candidates, the predetermined number of pieces of data is increased, and the processing returns to step S12.

In step S14, the display candidate determination part 17 outputs display candidates on the basis of the created determination model. The display candidate determination part 17 then determines the difference between the screen image actually selected through the input part 11 and the screen images output as display candidates (step S15). In the case where, after a predetermined number of display candidates are output, the rate of the differences from the actually selected screen images exceeds a predetermined rate (where the correct answer rate is lower than a predetermined rate), the processing returns to step S12. In the case where the rate of the differences does not exceed a predetermined rate (where the correct answer rate is in a predetermined range of a predetermined rate), the processing proceeds to step S16. In the case where the processing is determined to be continued in step S16, the processing returns to step S14. In other cases, the processing ends.

The display device 1 for the injection molding machine 200 according to the present embodiment described above exhibits the following effect.

(8) The display candidate determination part 17 determines the next transition destination on the basis of the results totalized by the totalizing part 16 and the history of the results having been totalized by the totalizing part 16 and further determines candidates for the screen images to be the determined transition destination as display candidates. This enables to output screen images each having a comprehensively high probability to be the next to transition to as display candidates on the basis of a plurality of pieces of information, including past operation information. Accordingly, the display candidate determination part 17 is capable of determining screen images to be display candidates having a higher correct answer rate, thereby enabling to reduce the labor of the operator.

The preferred embodiments of the display device for the injection molding machine according to the present invention have been described so far. The present invention is not limited to the above-described embodiments. Appropriate changes are possible. In an example, in each of the embodiments described above, each of the display device 1 for the plurality of the injection molding machines 200 may share the determined display candidates. As one example, the plurality of display devices 1 for the injection molding machines 200 may be connected to an administrative server (not shown) configured to manage display candidates. Each of the display devices 1 for the injection molding machines 200 may then determine display candidates by receiving display candidates from the administrative server. Specifically, the display candidate determination part 17 may acquire display candidates related to a predetermined screen image from the administrative server. The display candidate determination part 17 may acquire display candidates related to the operator M identified by the identification part 20 from the administrative server.

In the descriptions of the embodiments described above, the display part 100 includes the three screens 101, 102, 103. The present invention is not limited thereto. In an example, the display part 100 may include one screen or may include more screens. The display part 100 may be configured separately from the injection molding machine 200 or may be configured integrally.

EXPLANATION OF REFERENCE NUMERALS

1 DISPLAY DEVICE
13 OPERATION INFORMATION ACQUISITION PART
16 TOTALIZING PART
17 DISPLAY CANDIDATE DETERMINATION PART
18 DISPLAY CONTROL PART
19 OPERATION STATE ACQUISITION PART
20 IDENTIFICATION PART
100 DISPLAY PART
200 INJECTION MOLDING MACHINE
M OPERATOR

What is claimed is:

1. A display device for an injection molding machine comprising a display part capable of displaying a predetermined screen image and capable of displaying a candidate for a next screen image to transition to as a display candidate, the display device for the injection molding machine comprising a processor and a memory, the processor configured to:
    acquire, as operation information, operations performed related to a predetermined screen image being displayed;
    totalize the operations related to the predetermined screen image being displayed on the basis of the acquired operation information;
    perform weighting, with respect to the totalized acquired operation information, based on a predetermined coefficient;
    determine the candidate for the screen image to be the display candidate on the basis of the weighting; and
    display not only the predetermined screen image but also the determined display candidate based on one or more of the totalizing and the weighting.

2. The display device for the injection molding machine according to claim 1, wherein the processor
    totalizes the operations related to the predetermined screen image being displayed on the basis of at least one of a number of times of the input operations related to the predetermined screen image, a number of times of the input operations related to the predetermined screen image per a fixed time, a display time of the predetermined screen image, and a number of times of display of the predetermined screen image within a predetermined time, as the operation information.

3. The display device for the injection molding machine according to claim 2, wherein the processor
    performs the weighting with respect to the respective numbers of times and the display time included in the operation information, and further totalizes the operations related to the predetermined screen image being displayed on the basis of a result of the weighting.

4. The display device for the injection molding machine according to claim 1, wherein the processor
    totalizes the operations related to the predetermined screen image being displayed on the basis of the predetermined screen image and a number of times of a combination of the next screen image transitioned to and the original predetermined screen image, as the operation information.

5. The display device for the injection molding machine according to claim 1, wherein the processor is further configured to
    acquire an operation state of the injection molding machine, and
    determine the candidate for the screen image to be the display candidate on the basis of the acquired operation state.

6. The display device for the injection molding machine according to claim 1, wherein the processor is further configured to:
    identify an operator operating the injection molding machine, and
    determine a display candidate for each operator identified by the identification part.

7. The display device for the injection molding machine according to claim 1, wherein
    the determined display candidates are displayed in a list form or in a strip form.

8. The display device for the injection molding machine according to claim 1, wherein the processor
    determines a next transition destination on the basis of the totalized result and a history of totalized results, and further determines the candidate for the screen image to be the determined transition destination as the display candidate.

* * * * *